United States Patent
Franchitti et al.

(10) Patent No.: US 11,581,793 B2
(45) Date of Patent: Feb. 14, 2023

(54) CONDITION MONITORING DEVICE HAVING A POWER SWITCH BETWEEN AN INTEGRATED ENERGY HARVESTER AND A METHOD FOR OPERATING SAID POWER SWITCH

(71) Applicant: Aktiebolaget SKF, Gothenburg (SE)

(72) Inventors: Julian Franchitti, Biggar (GB); Mark Rhodes, South Queensferry (GB)

(73) Assignee: SKF Magnetic Mechatronics, Saint-Marcel (FR)

( * ) Notice: Subject to any disclaimer, the term of this patent is extended or adjusted under 35 U.S.C. 154(b) by 291 days.

(21) Appl. No.: 16/840,709

(22) Filed: Apr. 6, 2020

(65) Prior Publication Data

US 2020/0395835 A1 Dec. 17, 2020

(30) Foreign Application Priority Data

Jun. 11, 2019 (DE) .......................... 102019208469.9

(51) Int. Cl.
*H02K 35/02* (2006.01)
*G01H 11/06* (2006.01)
(Continued)

(52) U.S. Cl.
CPC ............. *H02K 35/02* (2013.01); *G01H 11/06* (2013.01); *H02J 50/001* (2020.01); *H02N 2/186* (2013.01); *G01M 13/045* (2013.01)

(58) Field of Classification Search
CPC ....... G01H 11/06; G01H 17/00; G01M 13/00; G01M 13/045; H02J 50/001; H02K 35/02; H02N 2/183; H02N 2/186
See application file for complete search history.

(56) References Cited

U.S. PATENT DOCUMENTS

2012/0133151 A1* 5/2012 Bottarel ................. H02K 35/02
290/1 A
2014/0152025 A1* 6/2014 Renga ..................... H02P 9/008
290/1 R
(Continued)

FOREIGN PATENT DOCUMENTS

CN 111525693 A 8/2020
CN 112414542 A 2/2021
(Continued)

*Primary Examiner* — David L Singer

(74) *Attorney, Agent, or Firm* — Garcia-Zamor Intellectual Property Law; Ruy Garcia-Zamor; Bryan Peckjian

(57) ABSTRACT

Condition monitoring device including a condition monitoring sensor configured to acquire vibration signals produced by the system and an integrated power supply having an energy harvester for providing power energy to the condition monitoring sensor and having an electromagnetic coil and a permanent magnet. The integrated power supply includes a system power switch between the energy harvester and the condition monitoring sensor and configured to be switched between at least a first high impedance position providing power energy of the energy harvester to the sensor and a second low impedance position where no power is transmitted to the sensor. Also, a system for restricting movement of the energy harvester configured to be connected across the electromagnetic coil in the low impedance passive position of the system power switch.

17 Claims, 2 Drawing Sheets

(51) Int. Cl.
   *H02N 2/18* (2006.01)
   *H02J 50/00* (2016.01)
   G01M 13/045 (2019.01)

(56) References Cited

U.S. PATENT DOCUMENTS

| | | | | |
|---|---|---|---|---|
| 2015/0222124 | A1* | 8/2015 | Van Amerongen | H02J 7/007 |
| | | | | 700/287 |
| 2015/0372626 | A1* | 12/2015 | Bartl | H02M 7/06 |
| | | | | 322/91 |
| 2016/0197508 | A1* | 7/2016 | Kruiskamp | H02M 3/156 |
| | | | | 307/130 |
| 2020/0208616 | A1* | 7/2020 | Lee | F03G 7/08 |
| 2022/0077715 | A1* | 3/2022 | Doron | H02M 7/217 |

FOREIGN PATENT DOCUMENTS

| | | | | |
|---|---|---|---|---|
| DE | 102004062180 | A1 * | 7/2006 | ............ H02K 35/02 |
| GB | 2546087 | A | 7/2017 | |
| JP | 2010063327 | A | 3/2010 | |
| KR | 20190112522 | A | 10/2019 | |

* cited by examiner

CONDITION MONITORING DEVICE HAVING A POWER SWITCH BETWEEN AN INTEGRATED ENERGY HARVESTER AND A METHOD FOR OPERATING SAID POWER SWITCH

CROSS-REFERENCE TO RELATED APPLICATIONS

This application claims priority to German Application no. 102019208469.9, filed Jun. 11, 2019, the contents of which are fully incorporated herein by reference.

TECHNICAL FIELD OF THE INVENTION

The present invention relates to the field of condition monitoring devices, and in particular to condition monitoring sensors for monitoring the condition of a system, such as for example a moving machine.

BACKGROUND OF THE INVENTION

Condition monitoring devices allow for the monitoring of the condition of a system without the need for manual inspection. These devices may be particularly advantageous in remote locations or locations which are difficult and/or dangerous to access, such as axles and/or bearings of a railway system.

The analysis of vibration signals produced by moving machines is well known in the field of machine condition monitoring.

Generally, electrical sensors are used to gather vibration measurements that may then be analysed to determine the machine condition and detect any machine defects.

In many situations, it may be convenient for the condition monitoring devices to be powered by an integrated generation source. Indeed, it may be necessary to provide electric energy to devices that are located in remote locations, for example where either power supply infrastructure does not exist or, if an infrastructure does exist, power is not available at the specific location where the device is installed.

To power condition monitoring devices, it is known to use a battery pack or limited capability power source such as an energy harvester.

Such condition monitoring device relies on vibrations produced by the machine being monitored; the mechanical vibration may thus be used as a power source that can be harvested locally. Indeed, vibration energy harvesting is the process of using vibrations from the environment to drive generators that provide power for use in electric devices. Such technology is particularly advantageous since it is capable of providing power autonomy to devices located at remote locations.

Vibration energy harvester generally generates electric power from a conductive coil that moves relative to a magnetic field. This relative movement is caused by vibrational energy from the machine under condition monitoring. Current is thus induced in a conductor moving through a magnetic field. Generally, vibration energy harvester comprises a fixed permanent magnet and a coil suspended by springs that is induced to oscillate relative to the permanent magnet. In another type of energy harvester, the permanent magnet is suspended on springs and induced to oscillate relative to a fixed coil.

In order to achieve efficient energy harvesting, it is necessary to increase oscillating movement within the harvester. However, during vibration signal measurement acquisition, current in the coil may produce an alternating magnetic field that can induce an unwanted signal in the condition monitoring sensor.

There is thus a need to reduce harvester oscillations during measurement acquisition.

The aim of the present invention is to provide a system and method for restricting movement of the energy harvester during vibration signal measurement acquisition by the condition monitoring sensor.

SUMMARY OF THE INVENTION

It is a particular object of the present invention to provide a condition monitoring device designed to be mounted on a system for monitoring the condition of the system, such as for example a moving machine.

The condition monitoring device comprises a condition monitoring sensor configured to acquire vibration signals produced by the system; and an integrated power supply for providing power energy to the condition monitoring sensor. The integrated power supply comprises an energy harvester having an electromagnetic coil and a permanent magnet, one of the electromagnetic coil and the permanent magnet being configured to oscillate one relative to the other, the integrated power supply further comprising a system power switch between the energy harvester and the condition monitoring sensor.

The system power switch is configured to be switched between at least a first high impedance position providing power energy of the energy harvester to the sensor and a second low impedance position where the energy harvester is short circuited, and no power is transmitted from the energy harvester to the sensor.

The condition monitoring device comprises a system for restricting movement of the energy harvester configured to be connected across the electromagnetic coil in the second low impedance position of the system power switch.

The impedance is considered as low when comprised between 5000 Ohms and 100 Ohms. The impedance of the movement restricting system is designed to strike a balance between two conflicting requirements. Impedance needs to be low to increase current flowing through the energy harvester coil. As impedance reduces and the current increases, the heat is increased, thereby potentially damage the integrated energy harvester and the condition monitoring sensor.

The energy harvester may thus be switched to the low oscillation mode during measurement acquisition by the condition monitoring sensor. Movement of the energy harvester may thus be restricted during measurement acquisition by the condition monitoring sensor. This allows earlier diagnosis of machine defects, as well as increase in the harvester service life, which in turn increases the condition monitoring service life.

Advantageously, the system power switch has an input connected to a first coil terminal of the coil and an output movable between the first high impedance position and the second low impedance position.

The input may, for example, be permanently connected to the first coil terminal of the coil.

In an embodiment, the movement restricting system comprises a cable having a first end configured to be connected to the output of the system power switch in the low impedance position and a second end connected between the output of the condition monitoring sensor and the second coil terminal of the coil.

The second end of the movement restricting system may, for example, be permanently connected between the output of the condition monitoring sensor and the second coil terminal of the coil.

The restricting movement system may comprise one or more resistors, and/or inductors and/or capacitive passive components. The restricting movement system is configured to reduce the energy harvester movement when it is not required to generate power.

In an embodiment, the system power switch is configured to be switched between the first high impedance position, the second low impedance passive position and a third very high impedance position where the output of the switch is not connected to any elements.

The impedance is considered as very high when strictly less than 100 Ohms. This third position allows the movement restriction of the oscillating energy harvester to be maximized for a brief period of time, for example 20 seconds, while a vibration measurement is captured in order to reduce any interfering noise generated by the harvester.

In an embodiment, the condition monitoring device further comprises an integrated energy storage device, such as for example a capacitor or a re-chargeable battery, for powering the condition monitoring sensor when the harvester is switched to low oscillation mode, i.e. the low impedance position. The integrated energy storage device is advantageously located parallel to the sensor 12 between the switch and the input of the sensor.

For example, the energy harvester comprises a housing, the electromagnetic coil being fixed to the housing and comprising electric terminals, and the permanent magnet being suspended between springs connected to the housing, the permanent magnet being induced to oscillate relative to the fixed coil.

In a non-limiting example, the device may further comprise a charging regulator connected at the output of the switch.

According to another aspect, the invention concerns a method for operating the system power switch of the condition monitoring device as described above. The method comprises: verifying the state of the condition monitoring sensor; switching the system power switch in the first high impedance position if the condition monitoring sensor is not acquiring measurements; and switching the system power switch in the second low impedance position if the condition monitoring sensor is acquiring measurements.

When the condition monitoring device comprises an integrated energy storage device, the method comprises: comparing the energy power contained in the energy storage device with a threshold; switching the system power switch in the first high impedance position if the power energy is below the threshold; and switching the system power switch in the second low impedance position if the power energy is more than the threshold.

BRIEF DESCRIPTION OF THE FIGURES

The present invention and its advantages will be better understood by studying the detailed description of specific embodiments given by way of non-limiting examples and illustrated by the appended drawings on which.

DETAILED DESCRIPTION OF THE INVENTION

Figure 1:
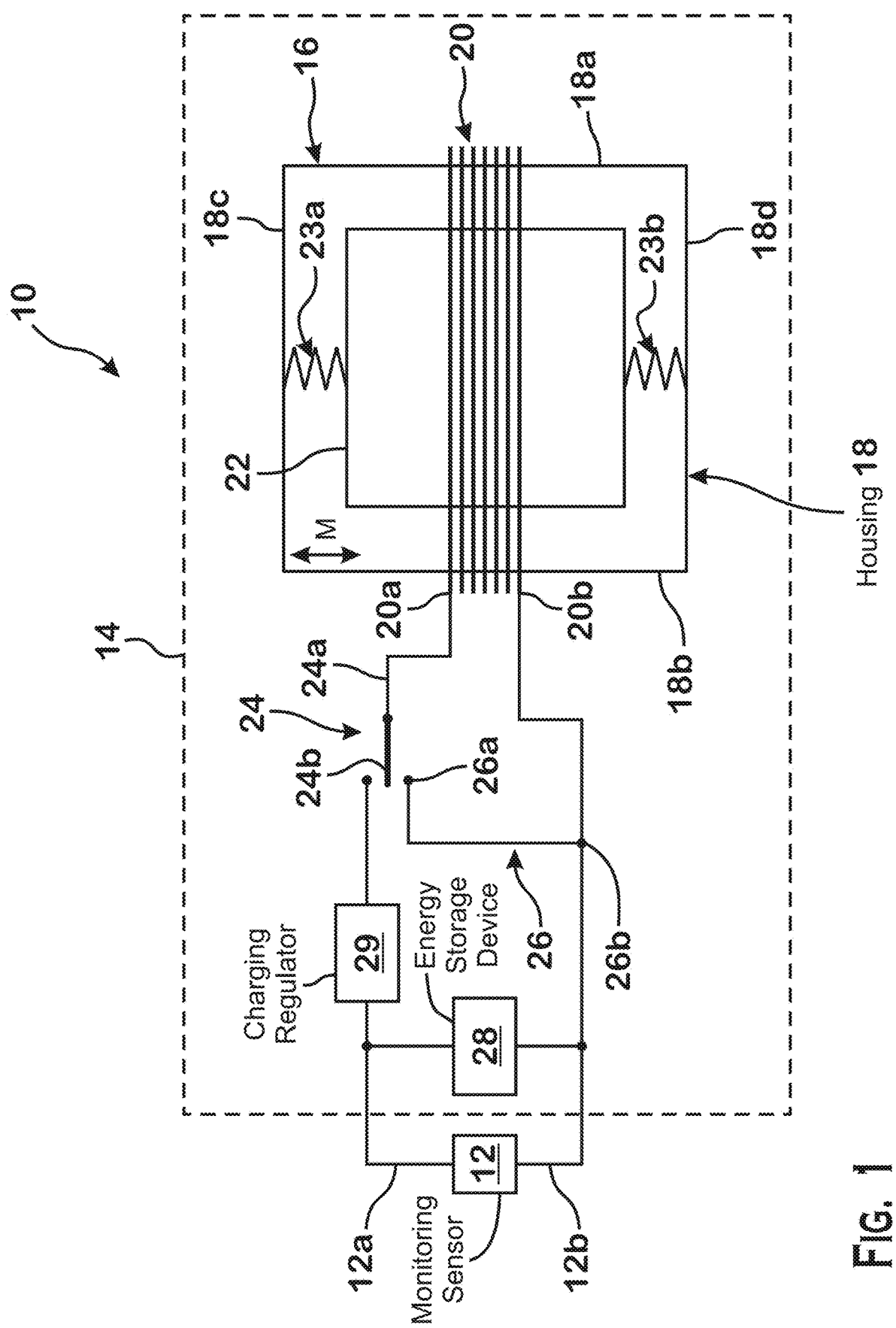
FIG. 1 is a schematic view of a condition monitoring device having a system for restricting movement of an energy harvester according to an embodiment of the invention.

Referring first to FIG. 1, which illustrates an embodiment of a condition monitoring device 10 according to the invention designed to be mounted on a system for monitoring the condition of the system, such as for example a moving machine.

The condition monitoring device 10 comprises a condition monitoring sensor 12 configured to acquire vibration signals produced by the moving machine. Alternatively, or in complement, the condition monitoring device comprises a sensor configured to acquire a signal representative of a temperature, a displacement, a speed or an acceleration.

The condition monitoring device 10 further comprises an integrated power supply 14 for providing power to the condition monitoring sensor 12.

The integrated power supply 14 has a limited capability power source such as an energy harvester 16.

The energy harvester 16 comprises a housing 18, a fixed electromagnetic coil 20 fixed to lateral surfaces 18a, 18b of the housing 18 and provided with electric terminals 20a, 20b.

The energy harvester 16 further comprises a permanent magnet 22 suspended between an upper and lower springs 23a, 23b connected respectively to an upper and a lower surface 18c, 18d of the housing 18. The permanent magnet 22 is induced to oscillate relative to the fixed coil 20.

The permanent magnet 22 is movably positioned inside and partially passes through the electromagnetic coil 20, such that the movement of the magnet 22 induces electric energy therein. The oscillating movement of the magnet 22 relative to the coil 20 gives rise to generating electricity by induction within the coil 20 which becomes available at terminals 20a, 20b.

Alternatively, the energy harvester may comprise a fixed permanent magnet and a coil suspended by springs that is induced to oscillate relative to the permanent magnet.

Generally, the energy harvester 16 generates power based on vibration of an element with respect to another.

The power supply 14 further comprises a system power switch 24 between the energy harvester 16 and the condition monitoring sensor 12, notably between the first coil terminal 20a and the input 12a of the condition monitoring sensor 12.

The system power switch 24 has an input 24a permanently connected to the first coil terminal 20a of the coil 20 and an output 24b that may be connected to the input 12a of the condition monitoring sensor 12.

The system power switch 24 may comprise any type of mechanical or semiconductor switch, such as a relay, BJT, MOSFET, IGBT, etc. . . . for example, the switch may be a p-channel field effect transistor.

The condition monitoring device 10 further comprises a system 26 for restricting movement of the energy harvester 16. The system 26 comprises a cable having a first end 26a that may be connected to the output 24b of the system power switch 24 and a second end 26b permanently connected between the output 12b of the condition monitoring sensor 12 and the second coil terminal 20b of the coil 20.

The restricting movement system 26 may comprise one or more resistors, and/or inductors and/or capacitive passive components. The restricting movement system 26 is configured to reduce the energy harvester movement when it is not required to generate power.

The output 24b of system power switch 24 is configured to be switched between three positions.

A first high impedance position where the output 24b is connected to the input 12a of the condition monitoring sensor 12, therefore providing power energy of the energy harvester 16 to the sensor 12. In this position, the oscillating element, here the permanent magnet 22 is free to move with little opposing force along the arrows M.

A second low impedance passive position where the output 24b is connected to the input 26a of the cable of the restricting movement system 26, therefore the energy harvester 16 is short circuited and no power is transmitted to the sensor 12. In this low impedance position, the opposing forces are increased thus limiting the oscillating movement of the permanent magnet 22. This position can be referred to as a low oscillation mode. In this low impedance position, the restricting movement system 26 is connected across the electromagnetic coil 20.

The impedance is considered as low when comprised between 5000 Ohms and 100 Ohms. The impedance of the movement restricting system 26 is designed to strike a balance between two conflicting requirements. Impedance needs to be low to increase current flowing through the energy harvester coil 20. As impedance reduces and the current increases, the heat is increased, thereby potentially damage the integrated energy harvester 16 and the condition monitoring sensor 12.

A third very high impedance position where the output 24b is not connected to any elements. The impedance is considered as very high when strictly less than 100 Ohms. This third position allows the movement restriction of the oscillating energy harvester to be maximized for a brief period of time, for example 20 seconds, while a vibration measurement is captured in order to reduce any interfering noise generated by the harvester.

Alternatively, the output 24b of system power switch 24 is configured to be switched only between the first high impedance position and the second low impedance position.

The energy harvester 16 is thus switched to the low oscillation mode during measurement acquisition by the condition monitoring sensor. This allows earlier diagnosis of machine defects, as well as increase in the harvester service life, which in turn increases the condition monitoring service life.

In a non-limiting example, the condition monitoring device 10 may comprise an integrated energy storage device 28, such as for example a capacitor or a re-chargeable battery, as a means of powering the condition monitoring sensor 12 when the harvester 16 is switched to low oscillation mode. The integrated energy storage device 28 is located parallel to the sensor 12 between the output 24b of the switch 24 and the input 12a of the sensor 12.

In a non-limiting example, the device 10 further comprise a charging regulator 29 connected at the output 24b of the switch 24.

Figure 2:
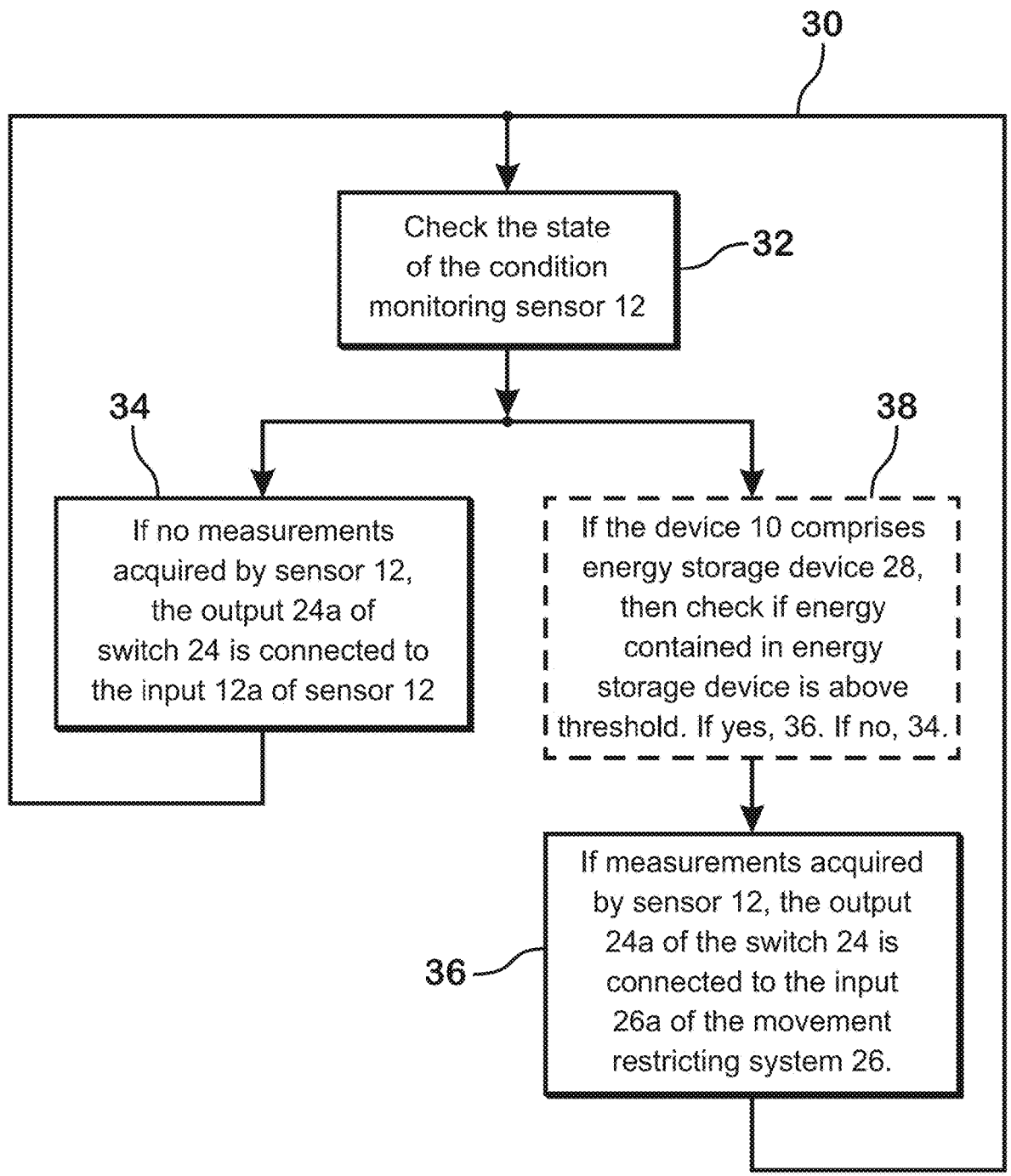
FIG. 2 is a flowchart outlining a method for operating a system power switch of the condition monitoring device of FIG. 1.

A method 30 for operating the system power switch 24 of the condition monitoring device 10 of FIG. 1 is shown on FIG. 2.

At block 32, the state of the condition monitoring sensor 12 is checked.

If the condition monitoring sensor 12 is not acquiring measurements, the output 24a of the switch 24 is connected, at block 34, to the input 12a of the sensor 12.

If the condition monitoring sensor 12 is acquiring measurements, the output 24a of the switch 24 is connected, at block 36, to the input 26a of the movement restricting system 26.

As a non-limiting example, when the condition monitoring device 10 comprises the integrated energy storage device 28, if the condition monitoring sensor 12 is not acquiring measurements, the method 30 compares, at block 38, the energy power contained in the energy storage device 28 with a threshold in order to provide energy power to the sensor 12. If the power energy is above the threshold, the output 24a of the switch 24 is connected, at block 36, to the input 26a of the movement restricting system 26 and if the power energy is less than the threshold, the output 24a of the switch 24 is connected, at block 36, to the input 12a of the sensor 12.

Thanks to the invention, the energy harvester is combined with a controlled impedance system. It is thus possible to select the load impedance presented to the energy harvester depending on the operation mode of the integrated condition monitoring device.

The invention claimed is:

1. A condition monitoring device designed to be mounted on a system for monitoring the condition of the system, the monitoring device comprising:
   a condition monitoring sensor configured to acquire vibration signals produced by the system; and
   an integrated power supply for providing power energy to the condition monitoring sensor; the integrated power supply comprising an energy harvester having an electromagnetic coil and a permanent magnet, the electromagnetic coil and the permanent magnet being configured to oscillate one relative to the other, the integrated power supply further comprising a system power switch between the energy harvester and the condition monitoring sensor, wherein
   the system power switch is configured to be switched between at least a first high impedance position providing power energy of the energy harvester to the sensor and a second low impedance passive position where the energy harvester is short circuited, and wherein
   the condition monitoring device comprises a system for restricting movement of the energy harvester configured to be connected across the electromagnetic coil in the second low impedance position of the system power switch, the restricted movement of the energy harvester allowing for the sensor to make a more accurate vibration measurement of the system due to reduced noise, the condition monitoring device comprising an output, the output being positionable in each of the following positions: a first position, a second position, or a third position, wherein
   the first position of the output connects the output to an input of the sensor to provide power thereto such that the permanent magnet freely moves with reduced opposing force along an axis of the electromagnetic coil;
   the second position of the output connects the output to the system of restricting movement such that power is not supplied to the sensor and the permanent magnet moves with greater opposing force than that experienced by the permanent magnet when the output is in the first position along the axis of the electromagnetic coil; and
   the third position of the output connects the output to no other element such that the permanent magnet moves with greater opposing force than that experienced by the permanent magnet when the output is in the second position along the axis of the electromagnetic coil.

2. The condition monitoring device according to claim 1, wherein the system power switch comprising the input, the input being connected to a first coil terminal of the coil, and the output, the output being movable between the first high impedance position and the second low impedance position.

3. The condition monitoring device according to claim 2, wherein the input is permanently connected to the first coil terminal of the coil.

4. The condition monitoring device according to claim 1, further comprising an integrated energy storage device for powering the condition monitoring sensor when the harvester is switched to low oscillation mode, the integrated energy storage device being located between the switch and the input of the sensor.

5. The condition monitoring device according to claim 1, wherein the energy harvester comprises a housing, the electromagnetic coil being fixed to the housing and comprising electric terminals, and the permanent magnet being suspended between springs connected to the housing, the permanent magnet being induced to oscillate relative to the fixed coil.

6. A condition monitoring device designed to be mounted on a system for monitoring the condition of the system, the monitoring device comprising:
   a condition monitoring sensor configured to acquire vibration signals produced by the system; and
   an integrated power supply for providing power energy to the condition monitoring sensor; the integrated power supply comprising an energy harvester having an electromagnetic coil and a permanent magnet, the electromagnetic coil and the permanent magnet being configured to oscillate one relative to the other, the integrated power supply further comprising a system power switch between the energy harvester and the condition monitoring sensor, wherein
   the system power switch is configured to be switched between at least a first high impedance position providing power energy of the energy harvester to the sensor and a second low impedance passive position where the energy harvester is short circuited, and wherein
the condition monitoring device comprises a system for restricting movement of the energy harvester configured to be connected across the electromagnetic coil in the second low impedance position of the system power switch,
   wherein the system power switch has an input connected to a first coil terminal of the coil and an output movable between the first high impedance position and the second low impedance position, and
   wherein the movement restricting system comprises a cable having a first end configured to be connected to the output of the system power switch in the low impedance position and a second end connected between the output of the condition monitoring sensor and the second coil terminal of the coil.

7. The condition monitoring device according to claim 6, wherein the second end of the movement restricting system is permanently connected between the output of the condition monitoring sensor and the second coil terminal of the coil.

8. The condition monitoring device according to claim 6, wherein the input is permanently connected to the first coil terminal of the coil.

9. The condition monitoring device according to claim 6, further comprising an integrated energy storage device for powering the condition monitoring sensor when the harvester is switched to low oscillation mode, the integrated energy storage device being located between the switch and the input of the sensor.

10. The condition monitoring device according to claim 6, wherein the energy harvester comprises a Previously Presented, the electromagnetic coil being fixed to the housing and comprising electric terminals, and the permanent magnet being suspended between springs connected to the housing, the permanent magnet being induced to oscillate relative to the fixed coil.

11. A condition monitoring device designed to be mounted on a system for monitoring the condition of the system, the monitoring device comprising:
    a condition monitoring sensor configured to acquire vibration signals produced by the system; and
    an integrated power supply for providing power energy to the condition monitoring sensor; the integrated power supply comprising an energy harvester having an electromagnetic coil and a permanent magnet, the electromagnetic coil and the permanent magnet being configured to oscillate one relative to the other, the integrated power supply further comprising a system power switch between the energy harvester and the condition monitoring sensor, wherein
    the system power switch is configured to be switched between at least a first high impedance position, a second low impedance passive position, and a third very high impedance position where the output of the switch is not connected to any elements, and wherein
    the condition monitoring device comprises a system for restricting movement of the energy harvester configured to be connected across the electromagnetic coil in the second low impedance position of the system power switch.

12. The condition monitoring device according to claim 11, wherein the system power switch has an input connected to a first coil terminal of the coil and an output movable between the first high impedance position, the second low impedance position, and the third very high impedance position.

13. The condition monitoring device according to claim 12, wherein the input is permanently connected to the first coil terminal of the coil.

14. The condition monitoring device according to claim 11, further comprising an integrated energy storage device for powering the condition monitoring sensor when the harvester is switched to low oscillation mode, the integrated energy storage device being located between the switch and the input of the sensor.

15. The condition monitoring device according to claim 11, wherein the energy harvester comprises a housing, the electromagnetic coil being fixed to the housing and comprising electric terminals, and the permanent magnet being suspended between springs connected to the housing, the permanent magnet being induced to oscillate relative to the fixed coil.

16. A method for operating a system power switch of a condition monitoring device comprising:
    providing a condition monitoring sensor configured to acquire vibration signals produced by a system;
    providing an integrated power supply for providing power energy to the condition monitoring sensor; the integrated power supply comprising an energy harvester having an electromagnetic coil and a permanent magnet, the electromagnetic coil and the permanent magnet being configured to oscillate one relative to the other, the integrated power supply further comprising a system power switch between the energy harvester and the condition monitoring sensor, wherein the system power switch is configured to be switched between at least a first high impedance position providing power energy of the energy harvester to the sensor and a second low impedance passive position where the energy harvester is short circuited, and wherein the condition monitoring device comprises a system for restricting movement of the energy harvester configured to be connected across the electromagnetic coil in the second low impedance position of the system power switch, verifying the state of the condition monitoring sensor;

switching the system power switch in the first high impedance position if the condition monitoring sensor is not acquiring measurements; and switching the system power switch in the second low impedance position if the condition monitoring sensor is acquiring measurements.

17. The method according to claim 16, comprising:

providing an integrated energy storage device for powering the condition monitoring sensor when the harvester is switched to low oscillation mode, the integrated energy storage device being located between the switch and the input of the sensor, comparing the energy power contained in the energy storage device with a threshold;

switching the system power switch in the first high impedance position if the power energy is below the threshold; and switching the system power switch in the second low impedance position if the power energy is more than the threshold.

\* \* \* \* \*